United States Patent
Vandendriessche et al.

(10) Patent No.: US 7,178,884 B2
(45) Date of Patent: Feb. 20, 2007

(54) BRAKING SYSTEM FOR AN AGRICULTURAL VEHICLE

(75) Inventors: Jean-Pierre Vandendriessche, Erpe-mere (BE); Stephan P. G. Deneir, Lede (BE); Tom A. De Lathauwer, Lede (BE); Willy F. Rogiers, Oostkamp (BE)

(73) Assignee: CNH America LLC, Racine, WI (US)

( * ) Notice: Subject to any disclaimer, the term of this patent is extended or adjusted under 35 U.S.C. 154(b) by 386 days.

(21) Appl. No.: 10/448,841

(22) Filed: May 30, 2003

(65) Prior Publication Data

US 2004/0050025 A1 Mar. 18, 2004

(30) Foreign Application Priority Data

Jun. 1, 2002 (GB) ................................ 0212859.3

(51) Int. Cl.
*B60T 8/32* (2006.01)
(52) U.S. Cl. ...................... 303/191; 303/9.67; 180/900
(58) Field of Classification Search ................ 303/191, 303/3, 9.67, 9.68, 15, 20, 24.1, 157, 179–181; 180/65.1, 403, 410, 900; 56/10.1, 11.3
See application file for complete search history.

(56) References Cited

U.S. PATENT DOCUMENTS

| 3,237,997 | A | * | 3/1966 | Kerr | 303/22.7 |
|---|---|---|---|---|---|
| 3,459,458 | A | * | 8/1969 | Campbell et al. | 303/9.65 |
| 3,834,769 | A | * | 9/1974 | Just | 303/9.61 |
| 4,054,326 | A | * | 10/1977 | Rohling | 303/9.68 |
| 4,475,773 | A | * | 10/1984 | Bartscher et al. | 303/9.61 |

FOREIGN PATENT DOCUMENTS

JP 10-56813 A 3/1998

* cited by examiner

*Primary Examiner*—Pam Rodriguez
(74) *Attorney, Agent, or Firm*—Rebecca Henkel

(57) ABSTRACT

An agricultural vehicle is disclosed having ancillary equipment that may be raised and lowered relative to the ground with consequential changing of the position of the center of gravity of the vehicle and having a hydraulic braking system comprising a master cylinder and a slave cylinder. The braking system further includes a pressure relief valve for limiting the hydraulic pressure applied to the slave cylinder only when the vehicle is in road mode. This ensures that the braking force does not exceed a safe limit below which the vehicle does not risk toppling forwards when braking.

15 Claims, 3 Drawing Sheets

BRAKING SYSTEM FOR AN AGRICULTURAL VEHICLE

FIELD OF THE INVENTION

The present invention relates to a braking system of an agricultural vehicle and is applicable in particular to vehicles, such as combine and forage harvesters, having ancillary equipment that may be raised and lowered relative to the ground with consequential raising and lowering of the centre of gravity of the vehicle.

BACKGROUND OF THE INVENTION

On combines and forage harvesters, as well as on other agricultural vehicles, brakes are used to turn the vehicle within a smaller turning circle than would be achievable by the use of the steering wheels. The brakes are also the preferred method of steering in difficult field conditions.

In order to achieve this, two separate braking circuits are provided which have separate brake pedals for braking the left and right sides of the vehicle. The brakes are designed to be very powerful so that steering using the brakes can be achieved with minimal effort.

Furthermore, in combine and forage harvesters the hydrostatic drive system is often used for braking. During field operation, the hydrostatic drive system serves as the primary means for stopping the vehicle while the friction brakes acting on the wheels are used primarily for steering.

Of course, the same braking systems must be capable of being used when the vehicle is being driven on roads. Under such driving conditions, the two brake pedals are physically connected to one another, so that they cannot be depressed separately, and symmetrical braking is achieved by hydraulically interconnecting the two braking systems so that the same braking pressure is applied to the slave cylinders on both sides of the vehicle.

As a result, for driving on normal roads, more braking capacity is available to the driver than is needed and in some countries there is a legal requirement for simultaneous braking using the hydrostatic drive system which increases the maximum braking force still further.

The availability of an excessively high braking force presents a particular problem in the case of harvesters that are being driven on a road in that they risk toppling forwards. This problem is aggravated by the fact that, when driven on a road, the header of a harvester, that is to say the attachment on the front of the vehicle which is operable to cut and collect the crop, has to be raised and therefore changes the position of the centre of gravity of the whole vehicle.

OBJECT OF THE INVENTION

The present invention therefore seeks to avoid the risk of an agricultural vehicle toppling forwards when driven on a road without reducing its braking capacity during field operation.

SUMMARY OF THE INVENTION

In accordance with a first aspect of the present invention, there is provided an agricultural vehicle having ancillary equipment that may be raised and lowered relative to the ground with consequential changing of the position of the centre of gravity of the vehicle and having a braking system of variable capacity to enable the maximum braking force to be reduced when the position of the centre of gravity of the vehicle is changed in order to prevent the vehicle from toppling forwards during maximum braking.

The braking capacity can be reduced in a variety of ways. A first possibility is to provide two slave cylinders on each wheel, both being activated under normal conditions and one being disabled when the braking capacity is to be reduced.

In this second aspect of the invention, there is provided an agricultural vehicle having ancillary equipment that may be raised and lowered relative to the ground with consequential changing of the position of the centre of gravity of the vehicle and having a hydraulic braking system comprising a master cylinder and a slave cylinder, wherein the braking system further includes a second slave cylinder associated with the same wheel as the first slave cylinder and a valve for isolating the second slave cylinder from the master cylinder when the position of the centre of gravity of the vehicle is changed, thereby ensuring that the braking force does not exceed a safe limit below which the vehicle does not risk toppling forwards when braking.

Another possibility for achieving a variable capacity braking system is to provide a switchable hydraulic amplification stage which operates during field use but not during road use.

In this third aspect of the invention, there is provided an agricultural vehicle having ancillary equipment that may be raised and lowered relative to the ground with consequential changing of the position of the centre of gravity of the vehicle and having a hydraulic braking system comprising a master cylinder and a slave cylinder, wherein the braking system additionally comprises a pressure amplification stage and a valve having a first position in which the master cylinder is connected to the slave cylinder by way of the pressure amplification stage and a second position in which the master cylinder is directly connected to the slave cylinder, the pressure amplification stage being bypassed in the second position of the valve to ensure that the braking force does not exceed a safe limit below which the vehicle does not risk toppling forwards when braking.

Other possibilities for a dual capacity or variable capacity braking system will be readily apparent to the person skilled in the art, but the preferred approach is to selectively limit the braking force by limiting the pressure in the hydraulic braking circuits during road use. The advantage of this approach is that it involves minimal alteration to existing braking systems and can therefore if necessary be retrofitted easily to existing vehicles.

In the fourth and most preferred aspect of the invention, there is provided an agricultural vehicle having ancillary equipment that may be raised and lowered relative to the ground with consequential changing of the position of the centre of gravity of the vehicle and having a hydraulic braking system comprising a master cylinder and a slave cylinder, wherein the braking system further includes a pressure relief valve for limiting the hydraulic pressure applied to the slave cylinder when the centre of gravity of the vehicle is raised, thereby ensuring that the braking force does not exceed a safe limit below which the vehicle does not risk toppling forwards when braking.

Preferably, the agricultural vehicle has two hydraulic braking systems with separate brake pedals each acting on a respective side of the vehicle, so as to enable the vehicle to be steered by the application of a braking force to only one side of the vehicle and the master cylinders of the two braking systems additionally comprise pressure equalisation ports that are connected to one another, each port including a non-return valve that is opened as soon as the associated brake pedal is depressed, so that equal pressures are applied to the slave cylinders on the opposites sides of the vehicle when the two brake pedals are depressed simultaneously.

The pressure relief valve is conveniently connected in this case to the hydraulic line interconnecting pressure equalisation ports of the master cylinders.

In order to activate and disable the pressure relief valve selectively, a two position valve may suitably be arranged in series with the pressure relief valve, the two position valve serving to isolate the pressure relief valve from the pressure equalisations ports in its first position but not in its second position.

The two position valve could simply be a manually operated ON/OFF valve with an interlock that obliges it to be opened before the two brake pedals can be connected to one another for driving on a road.

It is preferred, however, to provide a normally closed solenoid valve that is operated automatically in dependence upon the selected drive ratio, the speed of the vehicle, the height of the header or any other parameter indicative of road use, as opposed to field use, of the vehicle.

BRIEF DESCRIPTION OF THE DRAWINGS

The invention will now be described further, by way of example, with reference to the accompanying drawing, in which.

DETAILED DESCRIPTION OF THE PREFERRED EMBODIMENT

Figure 1:
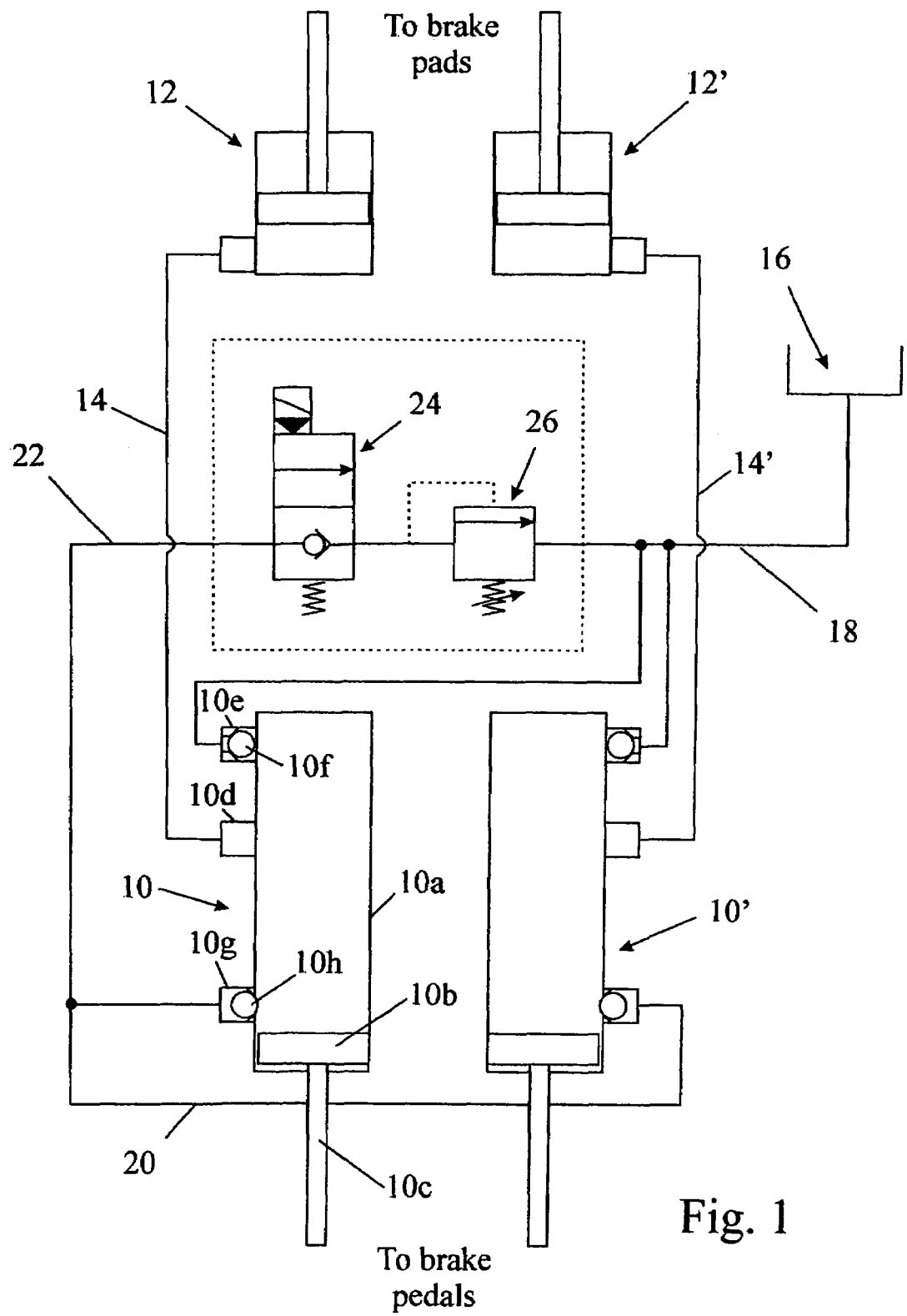
FIG. 1 is a block diagram of the hydraulic circuit of a braking system of an agricultural vehicle constructed in accordance with the first and fourth aspect of the invention.

FIG. 1 shows a braking system comprising two (left and right) master cylinders 10, 10' connected to two slave cylinders 12, 12' by way of respective hydraulic pressure lines 14, 14' to form separate left and right braking circuits. The two braking circuits are identical and only one of them needs to be described.

In each of the braking circuits, the master cylinder 10 comprises a housing 10a containing a piston 10b that is moved by means of an actuating rod 10c connected to a respective brake pedal. When the piston 10b is moved by depressing a brake pedal, fluid under pressure is supplied through a port 10d to the slave cylinder 12, the piston of which acts on a brake pad on a respective side of the vehicle.

Each of the master cylinders 10, 10' is further connected through a port 10e that incorporates a non-return valve 10f, to a common reservoir 16 at ambient pressure through a line 18. The reservoir maintains the circuits filled with hydraulic fluid as their volume increases through wear of the brake pads.

As so far described, each hydraulic circuit is entirely conventional and operates in the same manner as the braking system of most road vehicles.

Because two separate braking circuits are provided for the left and right side of the vehicle, during field operation the left and right sides of the vehicle can be braked separately by operating only one or other of the two brake pedals and this allows the vehicle to be steered by means of its brakes.

Such braking is inappropriate, for obvious reasons, when the vehicle is to be driven on a road. Thus, during road use, the brake pedals are mechanically connected to one another so that they cannot be operated separately. One cannot rely on the mechanical coupling of the brake pedals to ensure equal braking on both sides of the vehicle and this is instead accomplished, in a known manner, by interconnecting the hydraulic circuits. To this end, each of the master cylinders 10 and 10' additionally comprises a pressure equalisation port 10g that incorporates a non-return valve 10h. The piston 10b has a shoulder which acts on the closure member of the non-return valve 10h as soon as the brake pedal is depressed to connect the working chamber of the cylinder to a pressure equalisation line 20. If only one of the brake pedals is operated during field use, only one of the non-return valves 10h will be open and high pressure will not be able to flow from the actuated braking circuit to the other. However if both pedals are depressed, even by unequal amounts, the two circuits will be able to communicate with one another through the pressure equalisation line 20 to ensure symmetrical braking when the vehicle is in road use.

As so far described, the braking system is known in the context of brake steered agricultural vehicles. Master cylinders having an additional pressure equalisation which also incorporate a non-return valve in the pressure equalisation port that is opened as soon as the piston is moved are currently available and their internal construction need not therefore be described in greater detail herein.

The illustrated embodiment of the present invention comprises a solenoid operated two position valve 24 and a pressure relief valve 26 arranged in series with one another in a line 22 that leads from the pressure equalisation line 20 to the line 18 connected to the fluid reservoir 16.

The solenoid valve 24 is shown in its normal position for field use wherein it maintains the pressure equalisation line 20 isolated and does not therefore interfere with pressure supplied to the slave cylinders 12, 12'.

However, when a parameter is sensed that indicates that the vehicle risks toppling because it is being driven on a road with the header raised, the solenoid valve 24 is moved into its other position in which it connects the pressure equalisation line 20 to the pressure relief valve 26.

The pressure relief valve 26 is a spool valve that is acted upon in one direction by a spring and in the opposite direction by a pilot pressure derived from its intake port. As soon as the pressure applied to the relief valve 26 exceeds a threshold, which as represented by an arrow in the drawing may be adjustable to suit the vehicle, the valve opens and connects the pressure equalisation line 20 to the ambient pressure in the reservoir 16. In this way, the pressure delivered to the slave cylinders 12, 12' is limited to the value set by the pressure relief valve and the risk of the vehicle toppling is avoided.

The signal for operating the solenoid valve 24 may be derived from any suitable source, for example from a sensor that responds to the selected drive ratio, the speed of the vehicle or the height of the header.

It will be seen from the drawing that the additional components required to eliminate the risk of the vehicle toppling during road use are the two contained within the box drawn in dotted lines, namely the two position solenoid valve 24 and the pressure relief valve 26. These two components can be formed as a sub-assembly that may be connected using only two hydraulic connections to an existing braking system, thus making it possible to modify existing vehicles with relative ease.

Though the embodiment of FIG. 1 is preferred because of the ease of retrofitting, the capacity of the braking system can be altered in other ways as will now be described with reference to two further embodiments of the invention, shown in FIG. 2 and in FIGS. 3 and 4, respectively. In the case of both these further embodiments, all the components shown in FIG. 1, other than the two valves 24 and 26, are present. These are the components that are conventionally to be found in an agricultural vehicle that can be steered by asymmetrical braking.

Figure 2:
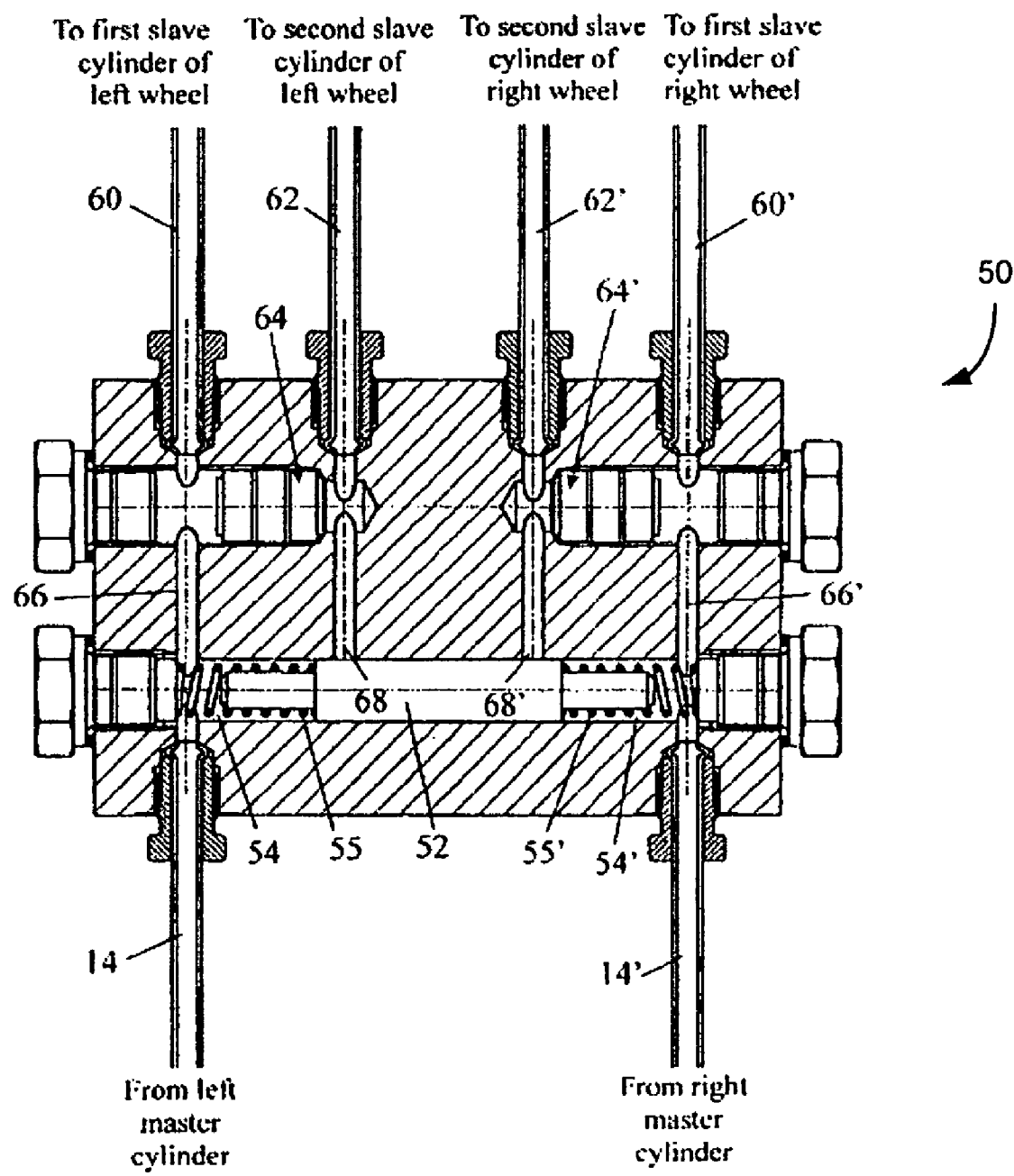
FIG. 2 is section through a valve of a braking system constructed in accordance with the second aspect of the invention.

In the case of the alternative embodiment, a valve body 50 as shown in FIG. 2 is provided, in addition to which a second brake calliper (not shown), which incorporates an additional slave cylinder, is provided on each wheel. Lines 60 and 62 lead to the separate slave cylinders on the left side of the vehicle and lines 60' and 62' lead to separate slave cylinders on the right side of the vehicle. Once again, primed reference numerals will be used to avoid unnecessary repetition of description.

The valve body 50 shown in FIG. 2 has two intake ports connected to the lines 14, 14' from the master cylinders 10, 10' and four output ports connected to the lines 60, 62, 60' and 62'. A valve spool 52 is mounted in a bore in the valve body 50 and at each end the spool is acted upon by a spring 55, 55' and the pressure in a control chamber 54, 54' that communicates with one of the intake ports. When equal pressures are applied to the two control chambers 54, 54', the spool 52 adopts its illustrated position. Here the lines 14 and 14' are connected to the lines 60, and 60' through passages 66 and 66' in the body 50 while the two further passages 68 and 68' that lead to the lines 62 and 62' are closed by the valve spool 52. Thus, when both brake pedals are depressed during road use of the vehicle, only one set of brake pads acts on each side of the vehicle.

When only the left side is braked, the pressure in the control chamber 54 will move the valve spool 52 to the right as viewed, allowing fluid to flow through the passage 68 to the line 62 leading to the slave cylinder of the second calliper and two sets of brakes will be activated on the left side of the vehicle but none on the right, causing the vehicle to be steered to the left. To allow hydraulic fluid to be drained from the second slave cylinder when the brake pedal is released and the passage 68 is again closed by the valve spool 52, a non-return valve 64 is provided which allows fluid to flow from the line 62 to the line 14 only in the direction that reduces the braking force on the wheels.

By operation of the valve body 50, it is ensured that maximum braking force can still be applied when braking only one wheel, by means of the first and second slave cylinders. The braking force will however be divided by two when braking both wheels simultaneously because only the first slave cylinder on the left and right wheel is used due to an equal pressure being applied to both sides of the valve spool 52.

Figure 3:
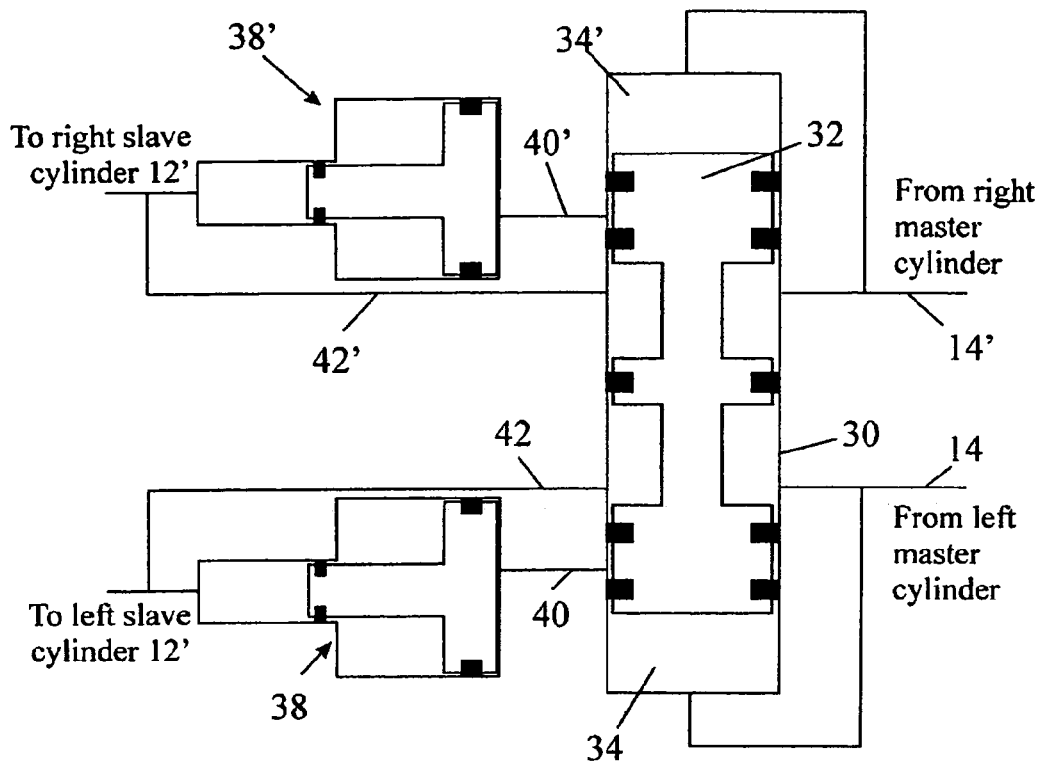
FIG. 3 is a block diagram of part of the hydraulic circuit of a braking system constructed in accordance with the third aspect of the invention.
Figure 4:
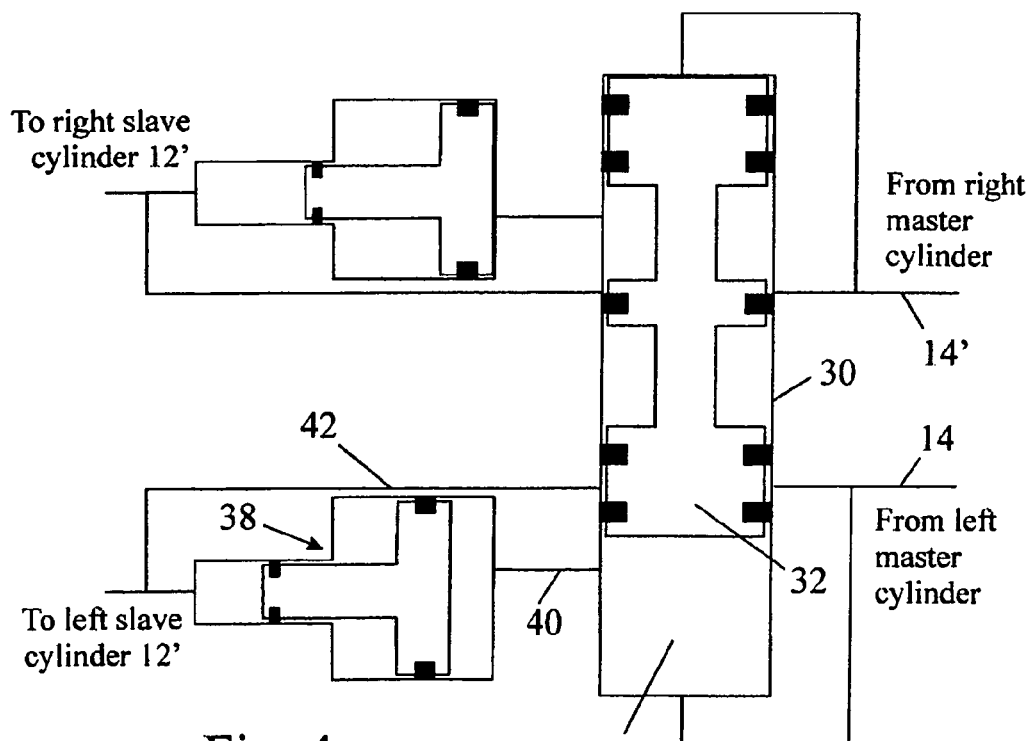
FIG. 4 is a block diagram similar to that of FIG. 3 showing the braking system during field use of the vehicle when the brake pedals are depressed separately.

The embodiment of FIGS. 3 and 4 comprises a valve 30 connected to the lines 14, 14' of FIG. 1 and two pressure amplifiers 38 and 38' each connected to a respective one of the slave cylinders 12 and 12' in FIG. 1.

The valve 30 is generally similar to the valve 50 in FIG. 2 and has control chambers 34 and 34' connected to the lines 14 and 14' from the master cylinders. As in the case of the valve spool 52 in FIG. 2, the spool 32 of the valve 30 adopts a central position, shown in FIG. 3, when both brake pedals are depressed during road operation and an end position, shown in FIG. 4, when only one brake pedal is depressed during field operation.

During road operation, the master cylinder lines 14 and 14' are connected to the slave cylinders 12 and 12' through lines 42 and 42' that bypass the pressure amplification stages 38 and 38' so that the latter have no effect. On the other hand, when the spool 32 moves to its end position shown in FIG. 4 because only the left brake pedal is depressed, the passage 42 is blocked by a land of the spool 32 and instead the pressure from the master cylinder line 14 is applied through the passage 40 to the amplification stage 38 which increases the pressure applied to the slave cylinder 12 by a factor equal to the ratio of the surface areas of the opposite ends of its piston. Similarly, on depressing the right brake pedal, the master cylinder line 14' is blocked by another land of the spool 32, preventing pressure to be transmitted to the right slave cylinder 12'.

Accordingly, when driving on the road and depressing both brake pedals simultaneously, the spool 32 is forced to stay in the middle of the valve 30, because of the equal pressure in the master cylinder lines 14 and 14'.

However, because of the pressure amplification stages 38 and 38', the system is able to create a higher braking force when the left or right brake is used alone. The system is dimensioned such that the braking force is within safe braking limits when driving on the road.

The invention claimed is:

1. An agricultural vehicle having ancillary equipment that may be raised and lowered relative to the ground with consequential changing of the position of the centre of gravity of the vehicle and having a hydraulic braking system comprising a master cylinder and a slave cylinder, wherein in that the braking system further includes a pressure relief valve for limiting the hydraulic pressure applied to the slave cylinder when the position of the centre of gravity of the vehicle is changed, thereby ensuring that the braking force does not exceed a safe limit below which the vehicle does not risk toppling forwards when braking, having two hydraulic braking systems with separate brake pedals each acting on a respective side of the vehicle so as to enable the vehicle to be steered by the application of a braking force to only one side of the vehicle and wherein the master cylinders of the two braking systems additionally comprise pressure equalization ports that are connected to one another, each port including a non-return valve that is opened as soon as the associated brake pedal is depressed, so that equal pressures are applied to the slave cylinders on the opposite sides of the vehicle when the two brake pedals are depressed simultaneously.

2. An agricultural vehicle as claimed in claim 1, wherein the pressure relief valve is connected to at least one hydraulic line interconnecting the pressure equalization ports of the master cylinders.

3. An agricultural vehicle as claimed in claim 2, wherein a two position valve is arranged in series with the pressure relief valve, the two position valve serving to isolate the pressure relief valve from the pressure equalization ports in its first position but not in its second position.

4. An agricultural vehicle as claimed in claim 3, wherein the two position valve is biased by a spring into its first position and is moved into its second position by a solenoid when the maximum braking force is to be limited.

5. An agricultural vehicle as claimed in claim 4, wherein the two position valve is moved into its second position in dependence upon the selected road speed drive ratio.

6. An agricultural vehicle as claimed in claim 5, wherein a threshold pressure at which the pressure relief valve opens is adjustable.

7. An agricultural vehicle as claimed in claim 4, wherein the two position valve is moved into its second position in dependence upon the speed of the vehicle.

8. An agricultural vehicle as claimed in claim 7, wherein a threshold pressure at which the pressure relief valve opens is adjustable.

9. An agricultural vehicle as claimed in claim 4, wherein the two position valve is moved into its second position by means responsive to the height of the ancillary equipment.

10. An agricultural vehicle as claimed in claim 9, wherein a threshold pressure at which the pressure relief valve opens is adjustable.

11. An agricultural vehicle as claimed in claim 4, wherein a threshold pressure at which the pressure relief valve opens is adjustable.

12. An agricultural vehicle as claimed in claim 3, wherein a threshold pressure at which the pressure relief valve opens is adjustable.

13. An agricultural vehicle as claimed in claim 2, wherein a threshold pressure at which the pressure relief valve opens is adjustable.

14. An agricultural vehicle as claimed in claim 1, wherein a threshold pressure at which the pressure relief valve opens is adjustable.

15. An agricultural vehicle comprising:
a braking system configured to at least reduce a speed of travel of the agricultural vehicle over a ground;
at least one piece of equipment that is adjustable between a raised position and a lowered position relative to the ground and, wherein adjustment between the raised position and the lowered position causes a corresponding adjustment in a position of a center of gravity of the agricultural vehicle; and
a braking control system:
 a master cylinder and a slave cylinder configured to control a flow of hydraulic fluid through the braking system to reduce the speed of travel of the agricultural vehicle;
 a pressure relief valve configured to control a pressure of the hydraulic fluid applied to the slave cylinder changes the position of the center of gravity of the agricultural vehicle to reduce a probability of the agricultural vehicle toppling forward during braking;
further comprising another braking control system and at least two brake pedals and wherein each of the at least two brake pedals is configured to control braking on a respective side of the agricultural vehicle to enable the vehicle to be steered by the application of a braking force to only one side of the vehicle.

* * * * *